US012769599B2

(12) United States Patent
Noda et al.

(10) Patent No.: US 12,769,599 B2
(45) Date of Patent: Oct. 20, 2026

(54) INFORMATION PROCESSING APPARATUS, NON-TRANSITORY COMPUTER READABLE MEDIUM, AND INFORMATION PROCESSING METHOD

(71) Applicant: FUJIFILM Business Innovation Corp., Tokyo (JP)

(72) Inventors: Hisashi Noda, Kanagawa (JP); Kazuo Hayashi, Kanagawa (JP); Seishiro Kato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/449,661

(22) Filed: Aug. 14, 2023

(65) Prior Publication Data

US 2024/0320071 A1 Sep. 26, 2024

(30) Foreign Application Priority Data

Mar. 23, 2023 (JP) ................................ 2023-046673

(51) Int. Cl.
*G06F 11/00* (2006.01)
*G06F 11/07* (2006.01)

(52) U.S. Cl.
CPC ...... *G06F 11/0733* (2013.01); *G06F 11/0793* (2013.01)

(58) Field of Classification Search
CPC ......................... G06F 11/0733; G06F 11/0793
See application file for complete search history.

(56) References Cited

U.S. PATENT DOCUMENTS 9,336,100 B2 * 5/2016 Kolassery ........... G06F 11/0721
11,715,188 B1 * 8/2023 Mody .................... G06V 10/40 382/307
2003/0110413 A1 * 6/2003 Bernklau-Halvor ......................... G06F 11/2294 714/25
2008/0170507 A1 * 7/2008 Handley ............... G06F 11/079 370/242
2008/0225738 A1 * 9/2008 Virdhagriswaran ......................... G06F 11/0733 358/1.15
2008/0294423 A1 * 11/2008 Castellani ........... G06F 16/3329 704/4
2015/0186251 A1 * 7/2015 Friedler .............. G06F 11/3688 717/124
2018/0082138 A1 * 3/2018 Ito ........................ G06V 10/955
2020/0387420 A1 * 12/2020 Terai ...................... G06F 11/079
2024/0118901 A1 * 4/2024 Bhardwaj ........... G06F 11/1633

FOREIGN PATENT DOCUMENTS

JP 2011191833 9/2011

* cited by examiner

*Primary Examiner* — Joshua P Lottich
(74) *Attorney, Agent, or Firm* — JCIPRNET

(57) ABSTRACT

An information processing apparatus includes a processor configured to compare a first process result with a second process result and identify an anormal processing unit having an anomaly from among multiple hardware processing units, the first process result being obtained after each of the multiple hardware processing units processes image information by using hardware, the second process result obtained after a software processing unit processes the image information by using software.

8 Claims, 7 Drawing Sheets

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2023-046673 filed Mar. 23, 2023.

BACKGROUND

(i) Technical Field

The present disclosure relates to an information processing apparatus, a non-transitory computer readable medium, and an information processing method.

(ii) Related Art

Japanese Unexamined Patent Application Publication No. 2011-191833 discloses a semiconductor integrated circuit in which multiple functional modules connected in series serially process data and that includes at least one error detector. The error detector detects an error of the functional modules and includes a transfer state verification unit, a signal acquisition unit, and a determination unit. The transfer state verification unit verifies the transfer state of each of signals and/or data exchanged between consecutive functional modules and identifies a pair of specific consecutive functional modules to be monitored and a specific signal to be monitored among signals between the specific functional modules. The signal acquisition unit acquires a specific signal transferred between the specific functional modules. On the basis of the specific signal acquired by the signal acquisition unit, the determination unit determines which one of the pair of consecutive specific functional modules causes an error.

SUMMARY

If there is a defect in an image output on the basis of image information serially processed by multiple hardware processing units included in an information processing apparatus by using hardware, it is not clear which one of the multiple hardware processing units has an anomaly.

Aspects of non-limiting embodiments of the present disclosure relate to an information processing apparatus, a non-transitory computer readable medium, and an information processing method that are enabled to identify which one of multiple hardware processing units that has an anomaly.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to compare a first process result with a second process result and identify an anormal processing unit having an anomaly from among multiple hardware processing units, the first process result being obtained after each of the multiple hardware processing units processes image information by using hardware, the second process result being obtained after a software processing unit processes the image information by using software.

BRIEF DESCRIPTION OF THE DRAWINGS

Exemplary embodiments of the present disclosure will be described in detail based on the following figures, wherein.

DETAILED DESCRIPTION

Hereinafter, examples of exemplary embodiments according to the present disclosure will be described on the basis of the drawings.

First Exemplary Embodiment

Information Processing Apparatus 10

Figure 1:
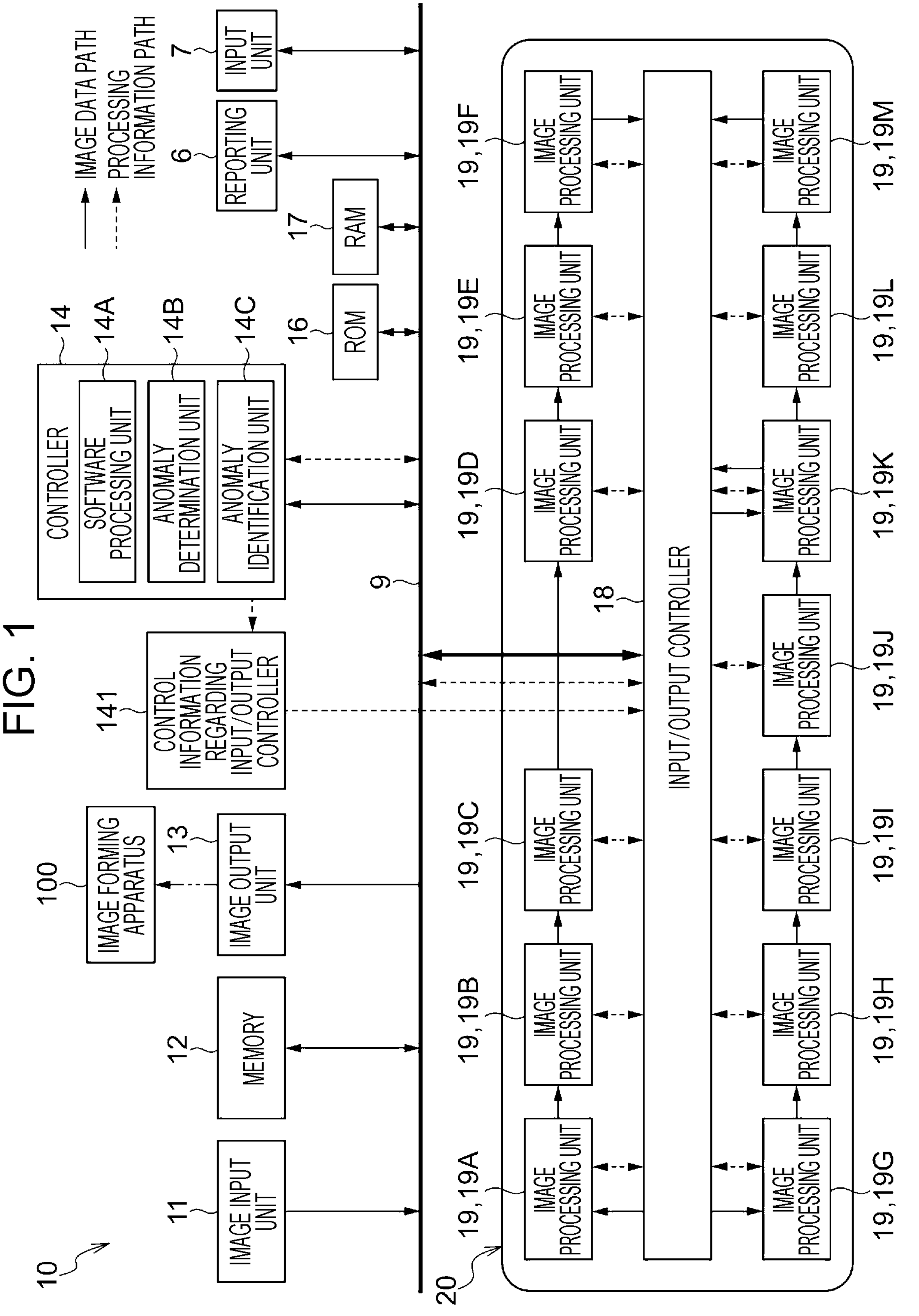
FIG. 1 is a schematic view illustrating the configuration of an information processing apparatus according to a first exemplary embodiment.

First, the configuration of an information processing apparatus 10 according to this exemplary embodiment will be described. FIG. 1 is a schematic view (specifically, a block diagram) illustrating the configuration of the information processing apparatus 10 according to this exemplary embodiment.

The information processing apparatus 10 illustrated in FIG. 1 is an apparatus that processes image data (that is, image information). The information processing apparatus 10 has a function of a computer and includes an image input unit 11, a memory 12, an image output unit 13, a controller 14, a ROM 16, a RAM 17, a reporting unit 6, an input unit 7, an input/output controller 18, multiple image processing units 19, and an integrated circuit 20 as illustrated in FIG. 1.

The image input unit 11, the memory 12, the image output unit 13, the controller 14, the ROM 16, the RAM 17, the reporting unit 6, the input unit 7, and the input/output controller 18 are connected to each other via a bus 9. This enables image data to be transmitted and received between the components.

The image input unit 11 is a functional unit (specifically, an interface) to which image data is input. For example, image data generated by an image reading unit such as a scanner by reading an image such as a document and an image data generated by a user by using image generation software or the like are input to the image input unit 11. An image conceptually includes a character and a document composed of one or more characters.

The memory 12 is a functional unit that stores various programs, various information, and the like. Specifically, the memory 12 is implemented by a memory device (that is, a storage) such as a hard disk drive (HDD), a solid state drive (SSD), a dynamic random access memory (DRAM), or a flash memory.

The image output unit 13 is a functional unit (specifically, an interface) that outputs the image data. The image output unit 13 outputs, for example, the image data processed by the multiple image processing units 19 to an image forming apparatus 100. In the image forming apparatus 100, an image is formed on the recording medium on the basis of the image data output from the image output unit 13.

The reporting unit 6 is a functional unit that reports various pieces of information to the user. For example, a display that displays a message as one of the various pieces of information is used as the reporting unit 6. For example, a liquid crystal display or an organic electro luminescence (EL) display may be used as the display.

The input unit 7 is a functional unit (specifically, a user interface) that enables the user to input various instructions. With the input unit 7, the user is able to input a setting instruction for various settings related to image processing. A touch panel integrated with the reporting unit 6 may be used as the input unit 7. The input unit 7 may be provided separately from the reporting unit 6, and a pointing device, an input key, or the like may be used as the input unit 7.

The input/output controller 18 is a functional unit that controls input and output of the image data to and from the multiple image processing units 19 and an external apparatus (for example, the memory 12). In this exemplary embodiment, the input/output controller 18 controls the input and output of the image data to and from the image processing units 19 by using control information 141 transmitted from the controller 14.

Each of the multiple image processing units 19 is an example of a hardware processing unit and is a functional unit that performs image processing (hereinafter, referred to as a hardware process) for processing, by hardware, the image data input by the input/output controller 18 from the image input unit 11 to the image processing units 19.

In this exemplary embodiment, for convenience of explanation, the multi0ple image processing units 19 are respectively image processing units 19A, 19B, 19C, 19D, 19E, 19F, 19G, 19H, 19I, 19J, 19K, 19L, and 19M as illustrated in FIG. 1.

Each of the multiple image processing units 19 is connected to the input/output controller 18 via processing information paths (refer to the broken-line arrows in FIG. 1). This enables the controller 14 to control each of the multiple image processing units 19 via the input/output controller 18.

In this exemplary embodiment, some of the multiple image processing units 19 (specifically, the image processing units 19A, 19F, 19G, 19K, and 19M) are connected to the input/output controller 18 via image data paths (refer to the solid-line arrows in FIG. 1). This enables the image data to be input from the input/output controller 18 to, for example, the image processing units 19A, 19G, and 19K of the multiple image processing units 19. The image data is also allowed to be output from, for example, the image processing units 19F, 19G, and 19M of the multiple image processing units 19 to the input/output controller 18.

Accordingly, in this exemplary embodiment, the image data input to the image processing unit 19A is not allowed to be output from the image processing units 19A, 19B, 19C, 19D, and 19E, to the input/output controller 18 and is allowed to be output, to the input/output controller 18, only from the image processing unit 19F placed last in a processing order.

In this exemplary embodiment, the image data input to the image processing unit 19G is not allowed to be output from the image processing units 19G, 19H, 19I, 19J, and 19L to the input/output controller 18 and is allowed to be output, to the input/output controller 18, from the image processing unit 19K or the image processing unit 19M placed last in the processing order.

Further, in this exemplary embodiment, the image data input to the image processing unit 19K is not allowed to be output from the image processing unit 19L to the input/output controller 18 and is allowed to be output, to the input/output controller 18, from the image processing unit 19K or the image processing unit 19M placed last in the processing order.

As described above, in the multiple image processing units 19, the image processing units 19 allowed to input or output the image data to or from the input/output controller 18 are limited to some image processing units 19.

The image processing units 19A, 19B, 19C, 19D, 19E, and 19F are connected to the image data paths (refer to the solid-line arrows in FIG. 1) in this order and serially execute the hardware process on the image data input to the image processing unit 19A. The image processing units 19G, 19H, 19I, 19J, 19K, 19L, and 19M are connected to the image data paths (refer to the solid-line arrows in FIG. 1) in this order and are allowed to serially execute the hardware process on the image data input to the image processing unit 19G. The hardware process is executable serially by the image processing units 19K. 19L, and 19M on the image data input to the image processing unit 19K.

In this exemplary embodiment, the input/output controller 18 and the multiple image processing units 19 are included in the integrated circuit 20 such as an application specific integrated circuit (ASIC). The input/output controller 18 and each image processing unit 19 are implemented by electronic components such as semiconductor elements included in the integrated circuit 20.

The controller 14 is an example of a processor and is a functional unit that controls the components including the input/output controller 18. Specifically, the controller 14 is configured from a general purpose processor such as a CPU.

The ROM 16 stores various programs including an information processing program, various pieces of data, and the like. The information processing program may be stored in the memory 12.

The RAM 17 is a memory used as a work area at the time of running any of the various programs. The controller 14 executes each of the various processes in such a manner as to load an appropriate program stored in the ROM 16 or the memory 12 into the RAM 17.

Further, the controller 14 runs the information processing program and thereby functions as a software processing unit 14A, an anomaly determination unit 14B, and an anomaly identification unit 14C. The software processing unit 14A is a functional unit that performs image processing for processing image data by software (hereinafter, referred to as a software process). The software processing unit 14A is capable of performing image processing equivalent to the hardware process executed by the multiple image processing units 19.

The anomaly determination unit 14B is a functional unit that determines whether any one of the multiple image processing units 19 has an anomaly. The anomaly determination unit 14B compares image data that has undergone the hardware process executed by the multiple image processing units 19 (that is, the result of the hardware process executed by the multiple image processing units 19 (hereinafter, referred to as a hardware process result)) with image data that has undergone the software process executed by the software processing unit 14A (that is, the result of the software process executed by the software processing unit 14A (hereinafter, a software process result)) and determines whether any one of the multiple image processing units 19 has an anomaly.

Specifically, the anomaly determination unit 14B numerically expresses, for example, the image data serving as a hardware process result and the image data serving as a software process result. If a difference between the numerical value of the hardware process result and the numerical value of the software process result is higher than or equal to a threshold, the anomaly determination unit 14B determines that one of the multiple image processing units 19 has an anomaly.

The anomaly identification unit 14C is a functional unit that identifies an anormal processing unit having an anomaly from among the multiple image processing units 19. The anomaly identification unit 14C compares the result of the normal process executed by the image processing units 19 (hereinafter, referred to as a normal process result) with the result of the replacement process executed by the software processing unit 14A (hereinafter, referred to as a replacement process result) and identifies an anormal processing unit from among the multiple image processing units 19.

Specifically, in this exemplary embodiment, numerically expresses, for example, the image data serving as the normal process result and the image data serving as the replacement process result. If a difference between the numerical value of the hardware process result and the numerical value of the replacement process result is higher than or equal to a threshold, the anomaly identification unit 14C identifies the target processing unit as the anormal processing unit.

The normal process is a process in which the multiple image processing units 19 serially execute the hardware process on the image data on the basis of an instruction to perform image processing. The normal process result is an example of a first process result.

The replacement process is a process in which one of the multiple image processing units 19 serving as a detection target for detecting whether the image processing unit 19 has an anomaly is replaced with the software processing unit 14A to execute the software process and in which the other image processing units 19 execute the hardware process on the image data. The replacement process result is an example of a second process result.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively.

It may thus be comprehended that in this exemplary embodiment, the input/output controller 18 and the multiple image processing units 19 partially serve as the processor. It may thus be comprehended that in this exemplary embodiment, the controller 14, the input/output controller 18, and the multiple image processing units 19 are an example of the processor. The order of operations of the processor is not limited to one described in the embodiments above, and may be changed.

Anomaly Detection Process According to this Exemplary Embodiment

Figure 2:
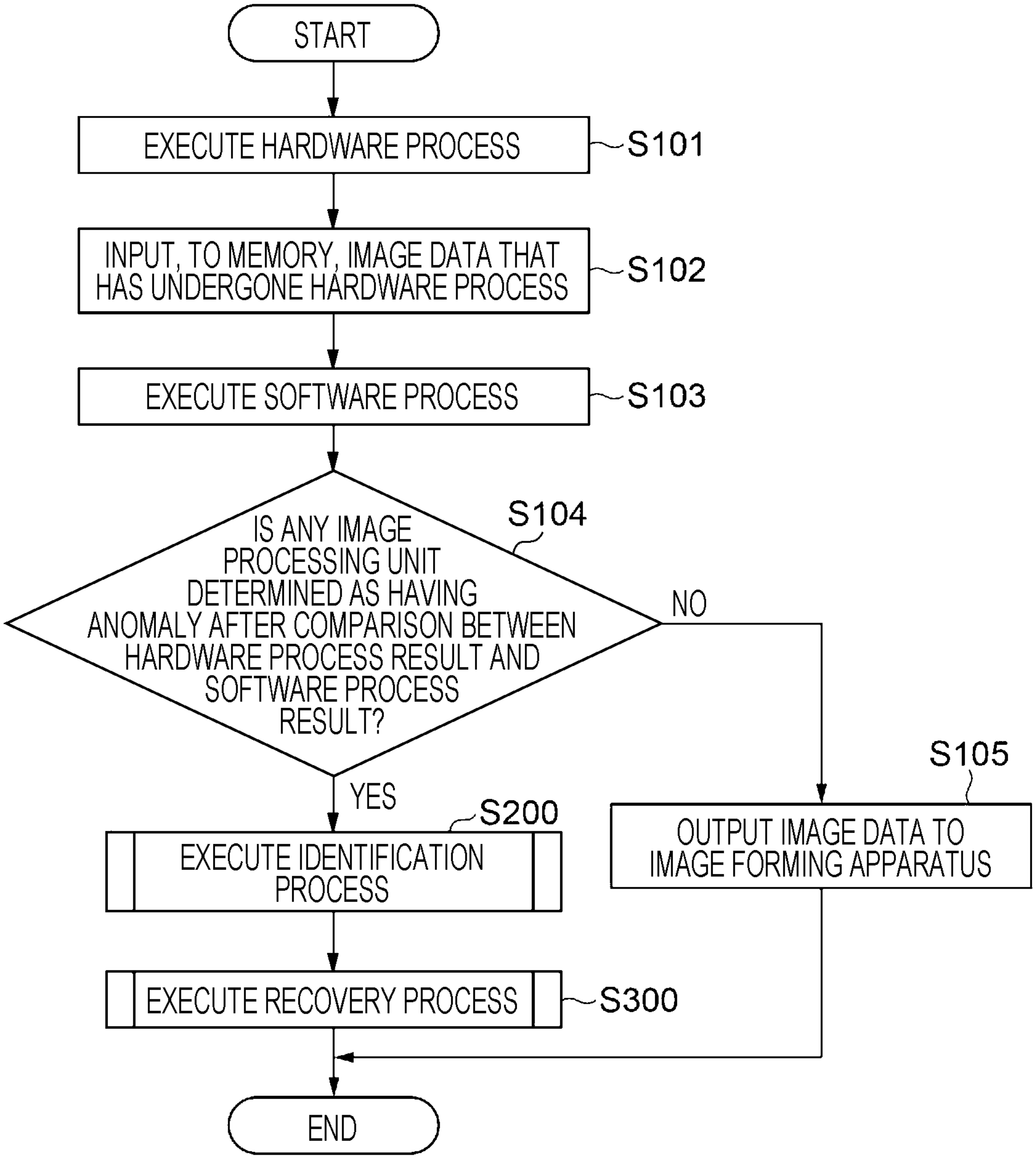
FIG. 2 is a flowchart illustrating an example of an anomaly detection process executed by the information processing apparatus according to the first exemplary embodiment.

An example of an anomaly detection process according to this exemplary embodiment will then be described. FIG. 2 is a flowchart illustrating an example of the anomaly detection process executed by the information processing apparatus 10.

In this exemplary embodiment, the controller 14 reads out the information processing program from the ROM 16 or the memory 12 and runs the information processing program, and thereby this process is executed. In this exemplary embodiment, for example, if an instruction to perform image processing of image data is acquired, the execution of this process is started. This process is executed in association with image processing operations in the information processing apparatus 10.

This process is a process for detecting whether any one of the multiple image processing units 19 has an anomaly and is not a process for identifying the anormal processing unit having the anomaly from among the multiple image processing units 19.

As illustrated in FIG. 2, in response to the controller 14 starting this process, the controller 14 controls the input/output controller 18 and the multiple image processing units 19, and thereby the multiple image processing units 19 serially execute the hardware process on the image data (step S101).

Specifically, in step S101, the controller 14 generates the control information 141 on the basis of a setting instruction or the like given by the user with the input unit 7 and controls the input/output controller 18. The input/output controller 18 inputs the image data input to one of the image input unit 11 to the image processing units 19 (specifically, one of the image processing units 19A. 19G, and 19K) on the basis of the control information 141, and the multiple image processing units 19 serially execute the hardware process on the image data.

The input/output controller 18 then inputs the image data that has undergone the hardware process serially executed by the multiple image processing units 19 to the memory 12 (step S102).

The software processing unit 14A then executes the software process serving as image processing equivalent to the hardware process serially executed by the multiple image processing units 19 on the image data input to the image input unit 11 (step S103).

The anomaly determination unit 14B then compares the image data (that is, the result of the hardware process executed by the multiple image processing units 19) that has undergone the hardware process executed by the multiple image processing units 19 with the image data (that is, the result of the software process executed by the software processing unit 14A) that has undergone the software process executed by the software processing unit 14A and determines whether any one of the multiple image processing units 19 has an anomaly (step S104).

Specifically, the anomaly determination unit 14B numerically expresses, for example, the image data serving as the hardware process result and the image data serving as the software process result. If a difference between the numerical value of the hardware process result and the numerical value of the software process result is higher than or equal to the threshold, the anomaly determination unit 14B determines that one of the multiple image processing units 19 has an anomaly.

The image data serving as the hardware process result may be extracted data obtained by extracting a partial area of the image data that has undergone the hardware process serially executed by the multiple image processing units 19. In this case, the software processing unit 14A executes a software process appropriate for the extracted data and acquires a software process result appropriated for the extracted data. An extraction process related to the extracted data may be executed, for example, when the input/output controller 18 inputs the image data to the memory 12.

The image data serving as the hardware process result may also be reduced data obtained by reducing the image data that has undergone the hardware process serially executed by the multiple image processing units 19. In this case, the software processing unit 14A executes a software process appropriate for the reduced data and acquires a software process result appropriate for the reduced data. A reduction process related to the reduced data may be executed, for example, when the input/output controller 18 inputs the image data to the memory 12.

If it is determined that any one of the multiple image processing units 19 has an anomaly (YES in step S104), the controller 14 executes an identification process for identifying the anormal processing unit (step S200), thereafter executes a recovery process (step S300), and then terminates this process. The identification process and the recovery process will be described later.

In contrast, if it is determined that the multiple image processing units 19 do not have an anomaly (NO in step S104), the controller 14 causes the image output unit 13 to output, to the image forming apparatus 100, the image data that has undergone the hardware process executed by the image processing units 19 (step S105) and terminates this process.

The anomaly detection process does not have to be executed every time the image processing is performed and may be executed, for example, every time a predetermined period of time has elapsed and if an instruction to perform the image processing is acquired.

The anomaly detection process does not have be executed in association with the image processing operations in the information processing apparatus 10. For example, the anomaly detection process may be executed as a dedicated detection process such as a detection mode and thus separately from the image processing operations.

Identification Process According to this Exemplary Embodiment

Figure 3:
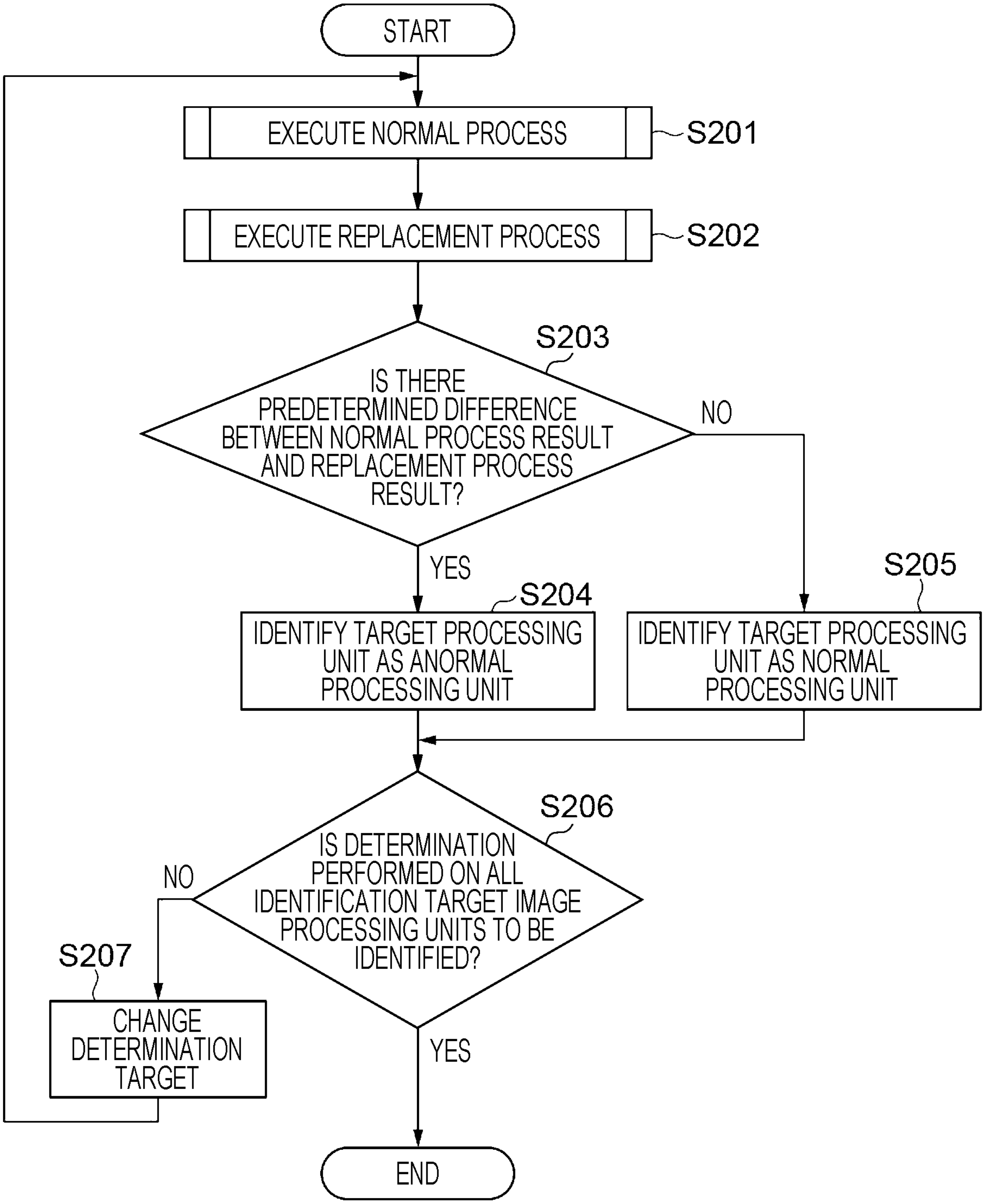
FIG. 3 is a flowchart illustrating an example of an identification process executed by the information processing apparatus according to the first exemplary embodiment.

An example of the identification process according to this exemplary embodiment will then be described. FIG. 3 is a flowchart illustrating an example of the identification process executed by the information processing apparatus 10.

As an example of the identification process, a case where one of the image processing units 19 serving as a detection target for detecting whether the image processing unit 19 has an anomaly (hereinafter, referred to as a target processing unit) is the image processing unit 19E is hereinafter described.

As illustrated in FIG. 3, in response to the start of this process, the multiple image processing units 19 including the image processing unit 19E execute the normal process for serially processing image data (step S201). Specifically, the normal process (see FIG. 4) is executed, for example, in the following manner.

Figure 4:
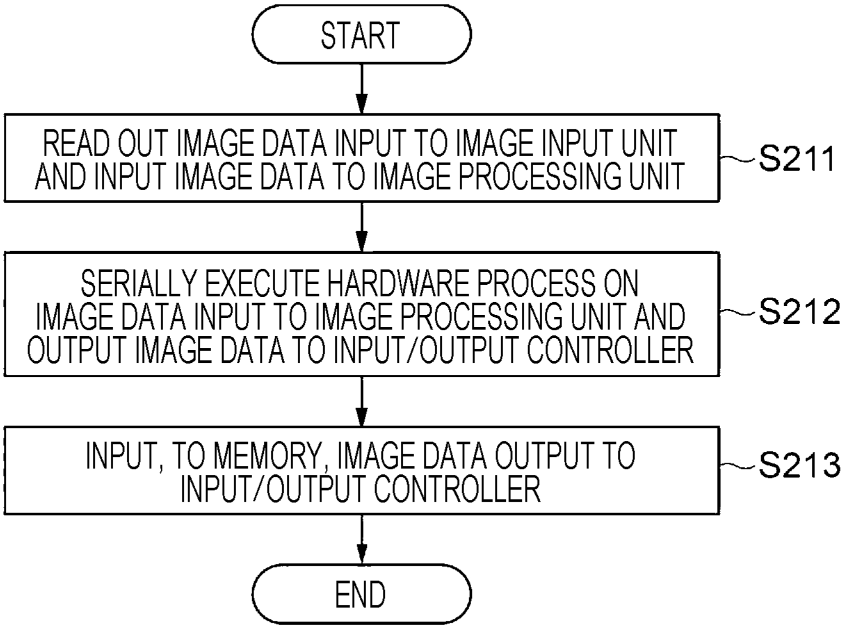
FIG. 4 is a flowchart illustrating an example of a normal process executed by the information processing apparatus according to the first exemplary embodiment.

As illustrated in FIG. 4, in the normal process, the input/output controller 18 reads out the image data input to the image input unit 11 and inputs the image data to the image processing unit 19A (step S211).

The image processing units 19A, 19B, 19C, 19D, 19E, and 19F then serially execute the hardware process on the image data input to the image processing unit 19A, and the image processing unit 19F outputs the image data to the input/output controller 18 (step S212).

The input/output controller 18 then inputs, to the memory 12, the image data output from the image processing unit 19F (step S213).

As illustrated in FIG. 3, subsequently to step S201, the replacement process is executed (step S202). In the replacement process, the image data is serially processed in such a manner that the image processing unit 19E serving as the target processing unit is replaced with the software processing unit 14A. Specifically, the replacement process (see FIG. 5) is executed, for example, in the following manner.

Figure 5:
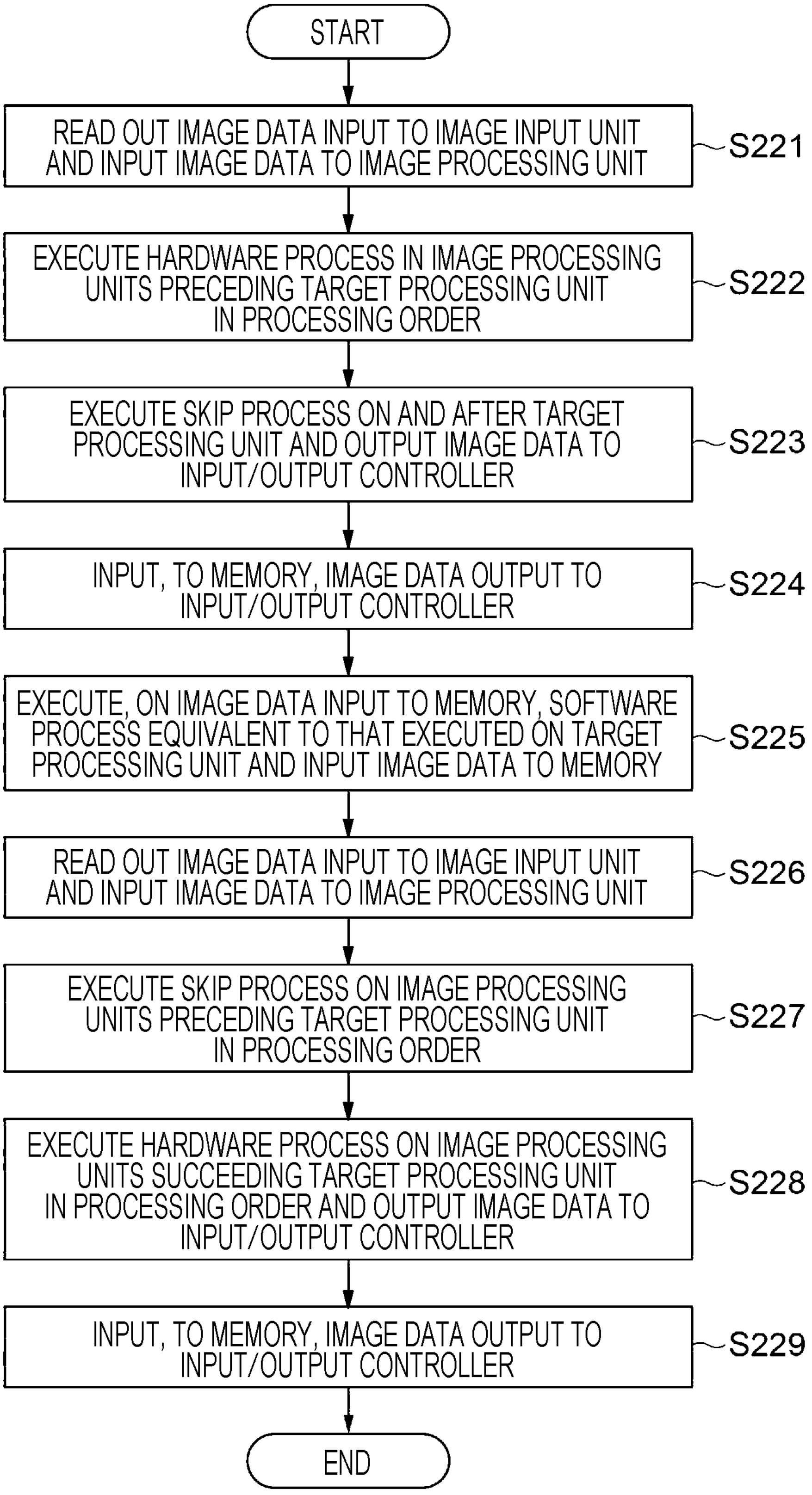
FIG. 5 is a flowchart illustrating an example of a replacement process executed by the information processing apparatus according to the first exemplary embodiment.

In the replacement process, as illustrated in FIG. 5, the input/output controller 18 reads out the image data input to the image input unit 11 and inputs the image data to the image processing unit 19A (step S221).

The image processing units 19A, 19B, 19C, and 19D then serially execute the hardware process on the image data input to the image processing unit 19A (step S222). As described above, in step S222, the image processing units 19A, 19B, 19C, and 19D preceding the image processing unit 19E in the processing order among the multiple image processing units 19 execute the hardware process.

The image processing units 19E and 19F then execute a process in which only transmission of image data is performed without executing the hardware process (hereinafter, referred to as a skip process) on the image data that has undergone the hardware process executed by the image processing units 19A, 19B, 19C, and 19D, and the image processing unit 19F outputs the image data to the input/output controller 18 (step S223). As described above, the process is not executed on and after the image processing unit 19E serving as the target processing unit, and the image data is output to the input/output controller 18.

The input/output controller 18 then inputs, to the memory 12, the image data output from the image processing unit 19F (step S224).

The controller 14 (software processing unit 14A) then executes a software process equivalent to the hardware process to be executed by the image processing unit 19E on the image data input to the memory 12 and inputs the resultant image data to the memory 12 (step S225).

The input/output controller 18 then reads out the image data input to the image input unit 11 and inputs the image data to the image processing unit 19A (step S226).

The image processing units 19A, 19B, 19C, and 19D then execute the skip process on the image data input to the image processing unit 19A (step S227). The image processing unit 19F then executes the hardware process and outputs the image data to the input/output controller 18 (step S228). As described above, the image data not processed on and after the image processing unit 19E is processed by the software processing unit 14A and thereafter is again processed by the image processing unit 19F succeeding the image processing unit 19E in the processing order.

The input/output controller 18 then inputs, to the memory 12, the image data output from the image processing unit 19F (step S229).

As illustrated in FIG. 3, subsequently to step S202, the anomaly identification unit 14C compares the image data related to the normal process (that is, the normal process result) with the image data related to the replacement process (that is, the replacement process result) and determines whether there is a predetermined difference between the normal process result and the replacement process result (step S203).

Specifically, the anomaly identification unit 14C numerically expresses, for example, the normal process result and the result of the replacement process executed by the software processing unit 14A and determines whether a difference between the numerical value of the normal process result and the numerical value of the replacement process result is higher than or equal to the threshold.

If it is determined that the difference is higher than or equal to the threshold (YES in step S203), the anomaly identification unit 14C identifies the image processing unit 19E serving as the target processing unit as an anormal processing unit (step S204). If it is determined that the difference is lower than the threshold (NO in step S203), the anomaly identification unit 14C identifies the image processing unit 19E serving as the target processing unit as a normal processing unit that operates normally (step S205).

The image data serving as the normal process result may be extracted data obtained by extracting a partial area of the image data that has undergone the hardware process serially executed by the multiple image processing units 19. In this case, the software processing unit 14A executes a software process appropriate for the extracted data and acquires a replacement process result appropriate for the extracted data. The extraction process related to the extracted data may be executed, for example, when the input/output controller 18 inputs the image data to the memory 12.

The image data serving as a normal process result may also be reduced data obtained by reducing the image data that has undergone the hardware process serially executed by the multiple image processing units 19. In this case, the software processing unit 14A executes a software process appropriate for the reduced data and acquires a replacement process result appropriate for the reduced data. The reduction process related to the reduced data may be executed, for example, when the input/output controller 18 inputs the image data to the memory 12.

The controller 14 then determines whether the identification process is performed on all of the image processing units 19 to be identified (step S206). If the controller 14 determines that the identification process is performed on all of the image processing units 19 (YES in step S206), the controller 14 terminates this process.

In contrast, if the controller 14 determines that the identification process is not performed on all of the image processing units 19 (NO in step S206), the controller 14 changes the determination target (step S207) and moves to step S201.

Not all of the image processing units 19 are required to be identified, and the identification process may be executed on some of the image processing units 19 as identification targets.

If the multiple image processing units 19 serve as identification targets, the identification process may be executed on a predetermined one of the image processing units 19 with priority.

In this exemplary embodiment, if the anomaly detection process results in a determination that any one of the multiple image processing units 19 has an anomaly, the identification process for identifying the anormal processing unit is executed; however, the timing of the identification process is not limited to this. For example, the identification process may be executed in response to an execution instruction given from the user, for example, in a case where the user looks at an image formed by the image forming apparatus 100 and verifies an anomaly in the image. In this case, the user may be reported to be prompted to verify a printed material including the image. Accordingly, the anomaly detection process described above is not necessarily required.

Recovery Process According to this Exemplary Embodiment

Figure 6:
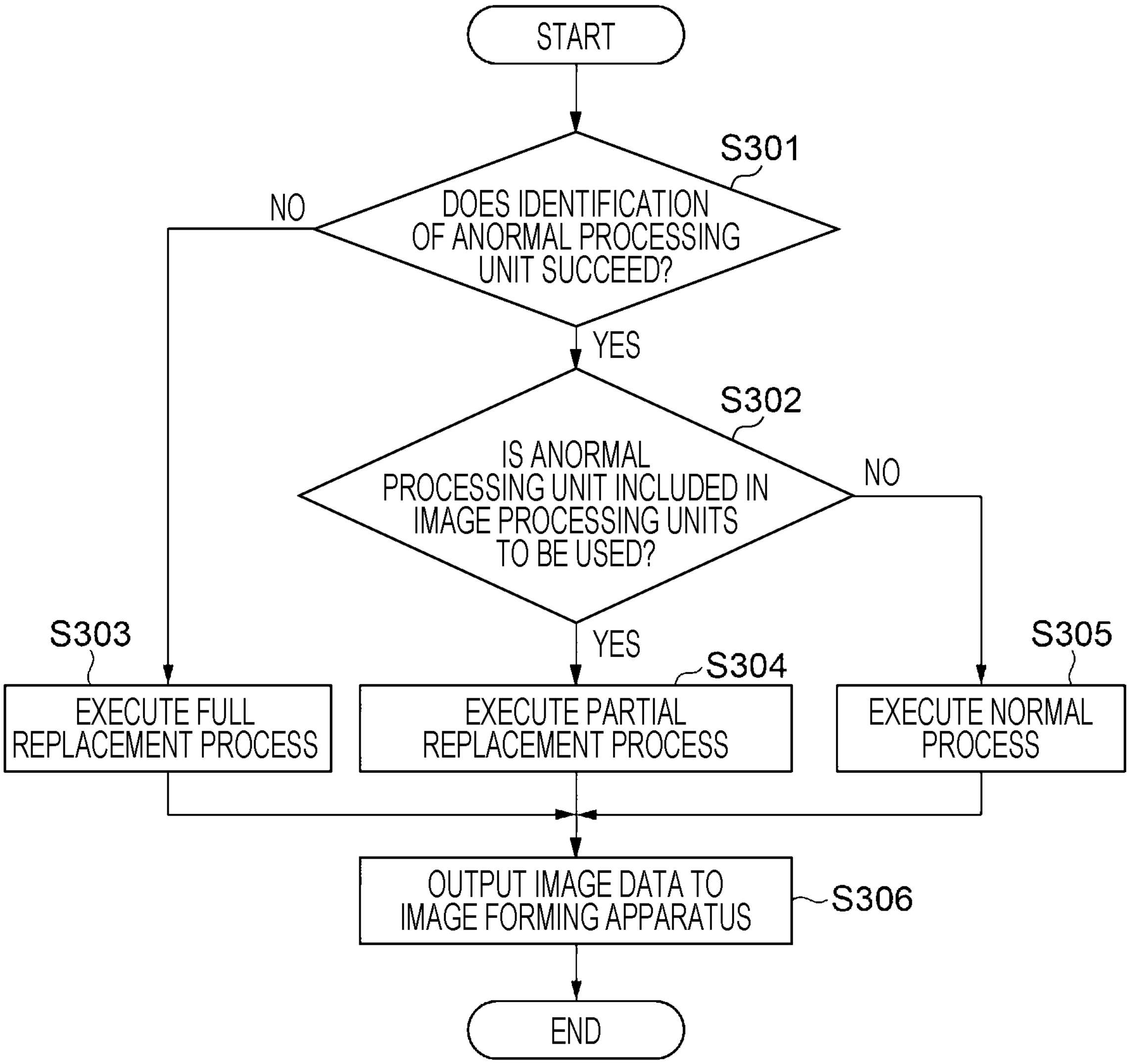
FIG. 6 is a flowchart illustrating an example of a recovery process executed by the information processing apparatus according to the first exemplary embodiment.

An example of the recovery process according to this exemplary embodiment will then be described. FIG. 6 is a flowchart illustrating an example of the recovery process executed by the information processing apparatus 10.

First, the controller 14 determines whether the identification of an anormal processing unit succeeds (step S301). If the controller 14 determines that the identification of an anormal processing unit succeeds (YES in step S301), the controller 14 moves to step S302. If the controller 14 determines that the identification of an anormal processing unit does not succeed (NO in step S301), the controller 14 moves to step S303.

In step S303, the controller 14 executes a full replacement process. The full replacement process is a process in which all of the hardware processes to be executed by the image processing units 19 to be used in performing the image processing are each replaced with the software process.

Specifically, the controller 14 executes the software process equivalent to all of the hardware processes to be executed by the image processing units 19 to be used in performing the image processing.

In step S302, the controller 14 determines whether the anormal processing unit is included in the image processing units 19 to be used. If the controller 14 determines that the anormal processing unit is included in the image processing units 19 to be used, the controller 14 executes a partial replacement process (step S304).

If the controller 14 determines that the anormal processing unit is not included in the image processing units 19 to be used, the controller 14 executes the normal process (step S305).

In the normal process, the hardware process is executed on all of the image processing units 19 to be used, and the processed image data is output from the image output unit 13.

In the partial replacement process, the anormal processing unit is replaced with the software processing unit 14A, and the image information is serially processed. The hardware process to be executed by the anormal processing unit is thus processed in such a manner as to be replaced with the software process, and the image processing units 19 other than the anormal processing unit execute the normal process.

As described above, if the anormal processing unit is identified, and if the image information is to be serially processed, the anormal processing unit is replaced with the software processing unit 14A, and the software processing unit 14A that has undergone the replacement and hardware processing units not identified as having an anomaly serially process the image information.

The image data that has undergone the image processing (specifically, one of the full replacement process, the partial replacement process, and the normal process) executed by the image processing units 19 is output to the image forming apparatus 100 via the image output unit 13 (step S306), and this process is terminated.

If one of the partial replacement process and the full replacement process is to be executed, the user may be reported. In addition, if one of the partial replacement process and the full replacement process is to be executed, the user may be inquired as to whether to execute one of the partial replacement process and the full replacement process.

Effects According to this Exemplary Embodiment

According to this exemplary embodiment, the anomaly identification unit 14C compares the normal process result with the replacement process result and identifies an anormal processing unit from among the multiple image processing units 19 (refer to the identification process described above).

In this exemplary embodiment, if the anomaly identification unit 14C identifies an anormal processing unit, and if the image information is to be serially processed, the controller 14 replaces the anormal processing unit with the software processing unit 14A, and the image information is serially processed.

In this exemplary embodiment, if an anormal processing unit is identified, and if image information is to be serially processed, the anormal processing unit is replaced with the software processing unit 14A, and the software processing unit 14A that has undergone the replacement and the image processing units 19 not identified as having an anomaly serially process the image information.

In this exemplary embodiment, the anomaly identification unit 14C compares a normal process result with a replacement process result. If there is a predetermined difference between the normal process result and the replacement process result, a target processing unit is identified as an anormal processing unit.

In this exemplary embodiment, the image information serially processed by the multiple image processing units 19 is allowed to be output from one of the image processing units 19 that is placed last in the processing order.

Further, in this exemplary embodiment, the image processing units 19A, 19B, 19C, and 19D preceding the image processing unit 19E in the processing order among the multiple image processing units 19 execute the hardware process, and the image data is output to the input/output controller 18 without executing the process on and after the image processing unit 19E serving as the target processing unit output.

The software processing unit 14A processes the image data yet to be processed on and after the image processing unit 19E, and thereafter the image processing unit 19F succeeding the image processing unit 19E in the processing order processes the image data again.

Second Exemplary Embodiment

Figure 7:
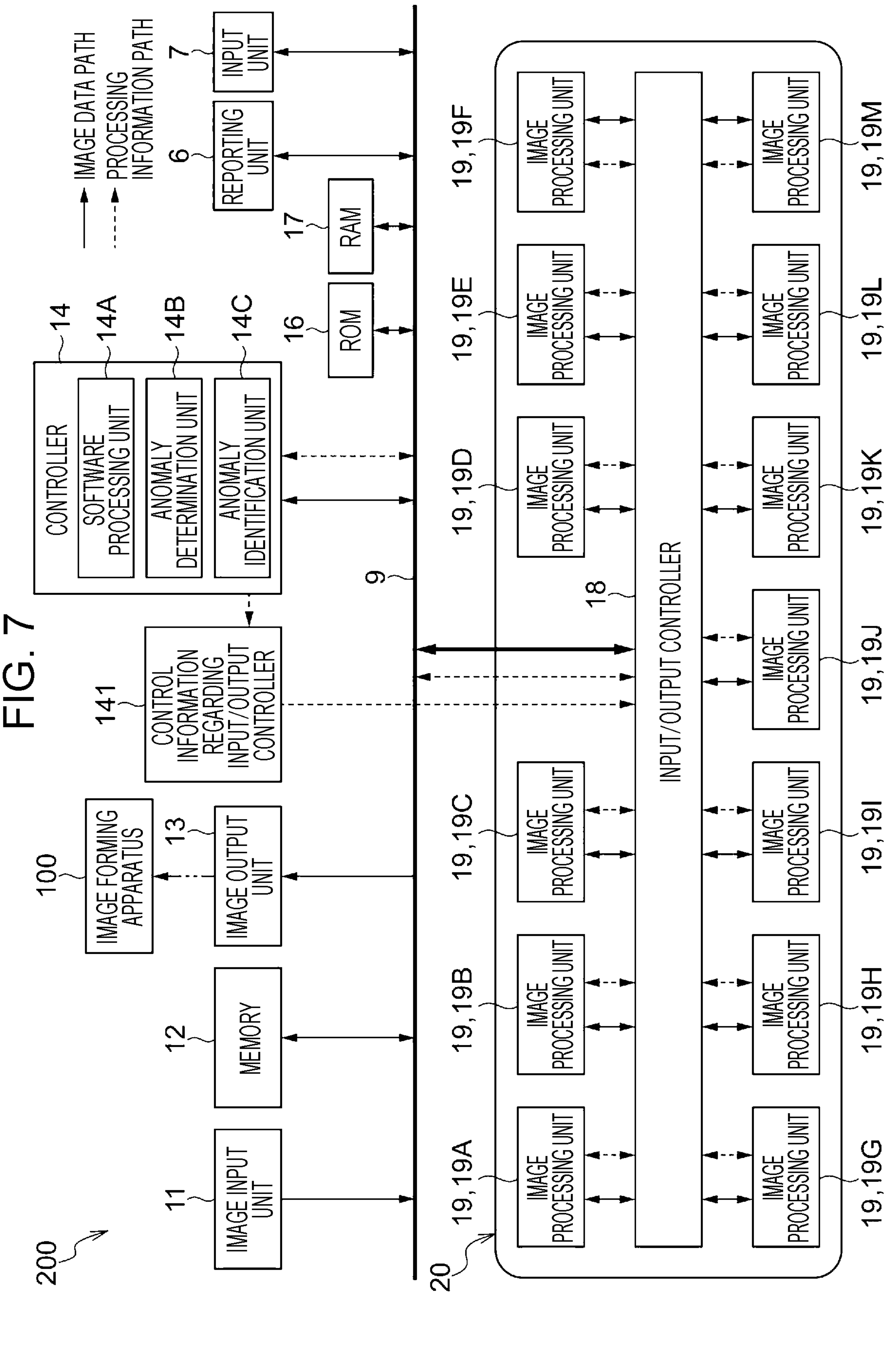
FIG. 7 is a schematic view illustrating the configuration of an information processing apparatus according to a second exemplary embodiment.

The configuration of an information processing apparatus 200 according to a second exemplary embodiment will then be described. FIG. 7 is a schematic view (specifically, a block diagram) illustrating the configuration of the information processing apparatus 200 according to this exemplary embodiment. Components configured in the same manner as in the first exemplary embodiment are denoted by the same reference numerals, and description thereof is appropriately omitted.

In the first exemplary embodiment, image data is allowed to be input from the input/output controller 18 to, for example, the image processing units 19A, 19G, and 19K of the multiple image processing units 19. The image data is allowed to be output from, for example, the image processing units 19F, 19G, and 19M of the multiple image processing units 19 to the input/output controller 18. In the exemplary embodiment described above, the limited image processing units 19 of the multiple image processing units 19 are allowed to input and output the image data to and from the input/output controller 18.

In contrast, in the second exemplary embodiment, all of the image processing units 19 are connected to the input/output controller 18 via image data paths (refer to the solid-line arrows in FIG. 7). This enables each of the image processing units 19 to input and output the image data to and from the input/output controller 18.

In the first exemplary embodiment, the limited image processing units 19 are allowed to input and output the image data, and thus the skip process is executed in the identification process. However, in the second exemplary embodiment, the image data is allowed to be input and output in all of the multiple image processing units 19, and thus the need to execute the skip process is eliminated.

Further, in this exemplary embodiment, the image processing units 19 may operate in any order and in any combination. The order and the combination of the image processing units 19 are changed by the input/output controller 18 on the basis of the control information 141 from the controller 14.

In this exemplary embodiment, the image processing units 19 may operate in any order and in any combination, and thus a normal process result to be compared may be diversified in the identification process (see FIG. 3). That is, in this exemplary embodiment, a result of the hardware process executed by one target processing unit alone, a result of processing executed by all of the image processing units 19, a result of processing executed by any of the multiple image processing units 19, and a result of processing executed by the image processing units 19 that are enabled (in an usable state) may be used as the normal process result.

Accordingly, in this exemplary embodiment, in the identification process, a target processing unit of the multiple image processing units 19 may be identified as an anormal processing unit, for example, in the following manner. Specifically, the result of the normal process in which the image information is processed by the target processing unit alone is compared with the result of the replacement process in which the replacement is performed on the target processing unit and only the software processing unit 14A processes the image information. If there is a predetermined difference between the normal process result and the replacement process result, the target processing unit is identified as an anormal processing unit.

In this exemplary embodiment, in the identification process, one of target processing units may be identified as an anormal processing unit in the following manner. Specifically, each of multiple results of the normal processes in which the multiple respective image processing units 19 serving as the target processing units process the image information may be compared with each of the multiple results of the replacement processes in which the software processing unit 14A processes the image information. If there is a predetermined difference between the normal process result and the replacement process result, the target processing unit is identified as the anormal processing unit.

Also in this exemplary embodiment, using a result of serially processing the image information as the normal process result or the replacement process result is not precluded.

Modification

In the first exemplary embodiment, if the identification of an anormal processing unit succeeds, the partial replacement process is executed in which the anormal processing unit is replaced with the software processing unit 14A and the image information is serially processed; however, exemplary embodiments of the disclosure are not limited to this.

For example, if the identification of an anormal processing unit succeeds, the full replacement process may be executed. In the full replacement process, all of the hardware processes to be executed by the image processing units 19 to be used in performing the image processing are replaced with the software process.

In this exemplary embodiment, the process for determining an anomaly of image data input with the image input unit 11 has heretofore been described. The determination process may be provided with an anomaly determination mode as a mode to be controlled by the controller 14, the anomaly determination mode including a mode in which anomaly determination is performed every time, a mode in which anomaly determination is performed at predetermined intervals or regularly every predetermined job, a mode in which anomaly determination is performed in response to an instruction from the user, and other modes.

In the description above, the image data input with the image input unit 11 is image data to undergo the image processing. The anomaly determination process may be executed on all of the pieces of input image data and a predetermined area extracted from the image data.

The present disclosure is not limited to the exemplary embodiments described above. Various modifications, changes, and improvements may be made without departing from the spirit of the disclosure. For example, any multiple ones of the exemplary embodiments and the modification that are described may be combined appropriately.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus includes:

a processor configured to:

compare a first process result with a second process result and identify an anormal processing unit having an anomaly from among multiple hardware processing units, the first process result being obtained after each of the multiple hardware processing units processes image information by using hardware, the second process result being obtained after a software processing unit processes the image information by using software.

(((2)))

In the information processing apparatus according to (((1))), the processor is configured to:

in a case where the anormal processing unit is identified and image information is to be serially processed, perform replacement of the anormal processing unit with the software processing unit and serially process the image information.

(((3)))

In the information processing apparatus according to (((2))), the processor is configured to:

cause the image information to be serially processed in the software processing unit that has undergone the replacement and a hardware processing unit of the hardware processing units that is not identified as having an anomaly.

(((4)))

In the information processing apparatus according to any one of (((1))) to (((3))), the processor is configured to:

compare the first process result with the second process result, the first process result being obtained after image information is serially processed in the multiple hardware processing units, the second process result being obtained after the image information is serially processed after a target processing unit serving as an anomaly detection target among the multiple hardware processing units is replaced with the software processing unit; and in response to presence of a predetermined difference between the first process result and the second process result, identify the target processing unit as the anormal processing unit.

(((5)))

In the information processing apparatus according to (((4))), the image information serially processed in the multiple hardware processing units is allowed to be output from a hardware processing unit of the multiple hardware processing units that is placed last in a processing order, and the second process result is a result obtained after the image information is processed in a hardware processing unit of the multiple hardware processing units that precedes the target processing unit in the processing order, is output without being processed on and after the target processing unit, is processed in the software processing unit, and is processed again in a hardware processing unit of the multiple hardware processing units that succeeds the target processing unit in the processing order.

(((6)))

In the information processing apparatus according to any one of (((1))) to (((5))), the processor is configured to:

compare the first process result obtained after the image information is processed in a target processing unit serving as an anomaly detection target among the multiple hardware processing units with the second process result obtained after the image information is processed in the software processing unit, and in response to presence of a predetermined difference between the first process result and the second process result, identify the target processing unit as the anormal processing unit.

(((7)))

In the information processing apparatus according to (((6))), the processor is configured to:

compare each of multiple the first process results obtained after each of the multiple hardware processing units that serves as the target processing unit processes the image information with each of the multiple the second process results obtained after the image information is processed in the software processing unit, and in response to presence of a predetermined difference between each first process result and a corresponding one of the second process results, identify the target processing unit as the anormal processing unit.

(((8)))

An information processing program causes a computer to execute a process including:

comparing a first process result with a second process result and identifying an anormal processing unit having an anomaly from among multiple hardware processing units, the first process result being obtained after each of the multiple hardware processing units processes image information by using hardware, the second process result being obtained after a software processing unit processes the image information by using software.

What is claimed is:

1. An information processing apparatus comprising:

a processor configured to:

compare a first process result with a second process result and identify an anormal processing unit having an anomaly from among a plurality of hardware processing units, the first process result being obtained after each of the plurality of hardware processing units processes image information by using hardware, the second process result being obtained after a software processing unit processes the image information by using software; and in a case where the anormal processing unit is identified and image information is to be serially processed, perform replacement of the anormal processing unit with the software processing unit and serially process the image information.

2. The information processing apparatus according to claim 1, wherein the processor is configured to:

cause the image information to be serially processed in the software processing unit that has undergone the replacement and a hardware processing unit of the hardware processing units that is not identified as having the anomaly.

3. The information processing apparatus according to claim 1, wherein the processor is configured to:

compare the first process result with the second process result, the first process result being obtained after image information is serially processed in the plurality of hardware processing units, the second process result being obtained after the image information is serially processed after a target processing unit serving as an anomaly detection target among the plurality of hardware processing units is replaced with the software processing unit; and in response to presence of a predetermined difference between the first process result and the second process result, identify the target processing unit as the anormal processing unit.

4. The information processing apparatus according to claim 3, wherein the image information serially processed in the plurality of hardware processing units is allowed to be output from a hardware processing unit of the plurality of hardware processing units that is placed last in a processing order, and wherein the second process result is a result obtained after the image information is processed in a hardware processing unit of the plurality of hardware processing units that precedes the target processing unit in the processing order, is output without being processed on and after the target processing unit, is processed in the software processing unit, and is processed again in a hardware processing unit of the plurality of hardware processing units that succeeds the target processing unit in the processing order.

5. The information processing apparatus according to claim 1, wherein the processor is configured to:

compare the first process result obtained after the image information is processed in a target processing unit serving as an anomaly detection target among the plurality of hardware processing units with the second process result obtained after the image information is processed in the software processing unit, and in response to presence of a predetermined difference between the first process result and the second process result, identify the target processing unit as the anormal processing unit.

6. The information processing apparatus according to claim 5, wherein the processor is configured to:

compare each of a plurality of the first process results obtained after each of the plurality of hardware processing units that serves as the target processing unit processes the image information with each of the plurality of the second process results obtained after the image information is processed in the software processing unit, and in response to presence of a predetermined difference between each first process result and a corresponding one of the second process results, identify the target processing unit as the anormal processing unit.

7. A non-transitory computer readable medium storing a program causing a computer to execute a process for information processing, the process comprising:

comparing a first process result with a second process result and identifying an anormal processing unit having an anomaly from among a plurality of hardware processing units, the first process result being obtained after each of the plurality of hardware processing units processes image information by using hardware, the second process result being obtained after a software processing unit processes the image information by using software; and in a case where the anormal processing unit is identified and image information is to be serially processed, performing replacement of the anormal processing unit with the software processing unit and serially process the image information.

8. An information processing method comprising:

comparing a first process result with a second process result and identifying an anormal processing unit having an anomaly from among a plurality of hardware processing units, the first process result being obtained after each of the plurality of hardware processing units processes image information by using hardware, the second process result being obtained after a software processing unit processes the image information by using software; and in a case where the anormal processing unit is identified and image information is to be serially processed, performing replacement of the anormal processing unit with the software processing unit and serially process the image information.

* * * * *